Oct. 27, 1964  M. H. PETERSON  3,153,889
FORAGE WAFERING MACHINE
Filed May 16, 1962  2 Sheets-Sheet 1

INVENTOR.
MERLE H. PETERSON
BY Wolfe, Hubbard,
Voit & Osann
ATTORNEYS.

INVENTOR.
MERLE H. PETERSON
BY Wolfe, Hubbard
Voit & Osann
ATTORNEYS.

United States Patent Office 3,153,889
Patented Oct. 27, 1964

3,153,889
FORAGE WAFERING MACHINE
Merle H. Peterson, Livonia, Mich., assignor to Massey-Ferguson Inc., Detroit, Mich., a corporation of Maryland
Filed May 16, 1962, Ser. No. 195,198
10 Claims. (Cl. 56—1)

The present invention relates generally to improvements in hay wafering or pelleting machines and more particularly to an improved mechanism for exhausting excess air entrapped within the wafering chamber of such machines.

In order to decrease the labor requirements associated with the harvesting of relatively bulky forage crops and to increase the efficiency of mechanized harvesting, as well as to improve the quality and palatability of such crops, various forms of hay wafering or pelleting machines have been developed. These machines are adapted to pick up the field-cured crop material, which has been previously placed in a windrow, and to deliver the collected material to a power driven wafering or pelleting mechanism which, in turn, compresses the crop material into uniform, relatively small and tightly packed bundles, commonly referred to as wafers or pellets. The wafers are then customarily elevated and deposited into a suitable receptacle such as a trailing wagon, and when a sufficient quantity has accumulated they are transferred to an appropriate storage facility. One example of such a hay wafering machine is that disclosed in copending patent application Serial No. 153,599, filed November 20, 1961, by Vernon J. Lundell.

In its typical form, such a hay wafering machine includes a rotary flail-type pick-up unit for gathering the forage crop and for chopping and intermixing or homogenizing the crop material. The pick-up unit includes a delivery chute for receiving the homogenized crop material from the flail and directing it to a transfer bin or hopper. The gathered material is impelled, both physically and by the substantial air blast created by the rotary-flail, through the chute to the hopper. From the hopper, the crop material is conveyed into a wafering chamber for compacting. With this arrangement a substantial volume of air is also directed into the hopper and into the wafering chamber along with the crop particles. This can result in an air pressure build-up within the wafering chamber.

Such a pressure build-up may be undesirable in regard to both the operation of the transfer mechanism and the operation of the wafering mechanism. In the transfer mechanism a pressure build-up can produce a substantial "head" which reacts against the stream of incoming material and tends to impede the flow of material into the wafering chamber. Within the wafering chamber trapped air not only interferes with the introduction of the crop material, but the resulting turbulence tends to "float" the crop particles and thus impair the operation of the mechanism in urging the material into the wafering dies. Various arrangements have been tried in the past in an attempt to overcome this problem. For example, relief openings have been provided in the walls of the hopper to allow the excess air to escape. However, due to the substantial velocity of the air stream, these discharge openings also permit the escape of part of the homogenized crop material entrained in the air stream. In another arrangement, baffles have been inserted to divide the delivery chute so that the air and crop material flow along one side of the chute and the air flow can return by way of the other side. These arrangements have, in part, relieved the pressure build-up in the hopper but they have not been effective to eliminate the air which is trapped in the wafering chamber.

Accordingly, it is the primary object of the present invention to make provision for exhausting excess air from the wafering chamber of such machines. Moreover, it is a related object to minimize the loss of crop material which is entrained in the air exhausted from the wafering chamber.

It is an additional object to provide for recirculating the air and any crop particles exhausted from the wafering chamber to the rotary flail for subsequent entrainment of such crop particles with particles newly delivered by the flail pick-up for delivery to the wafering chamber.

In one of its aspects it is also an object to provide a means for assisting in exhausting and recirculating the air from the wafering chamber.

Other objects and advantages of the invention will become apparent from the following detailed description and upon reference to the accompanying drawings, in which.

Figure 1:
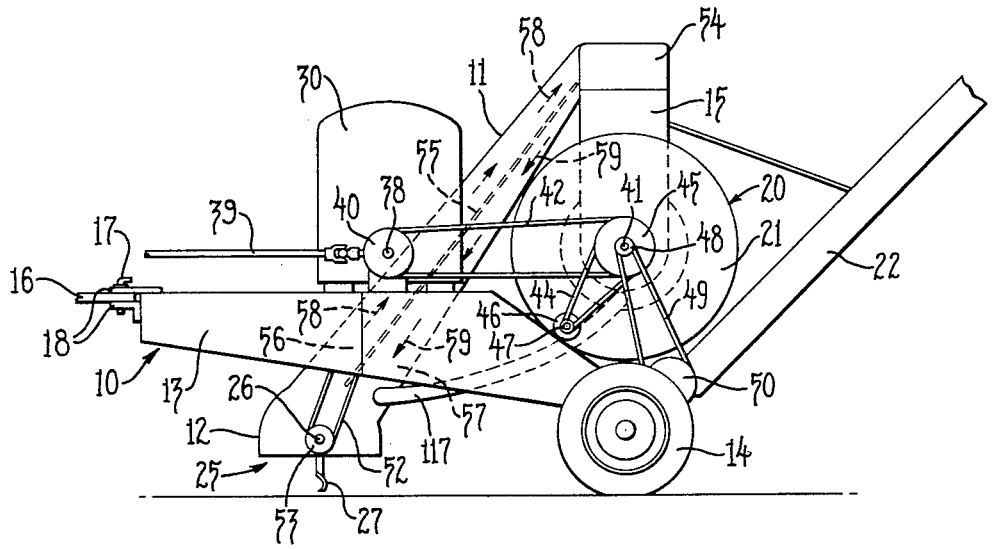
FIGURE 1 is a left-side elevation of an illustrative hay wafering machine embodying the present invention.
Figure 2:
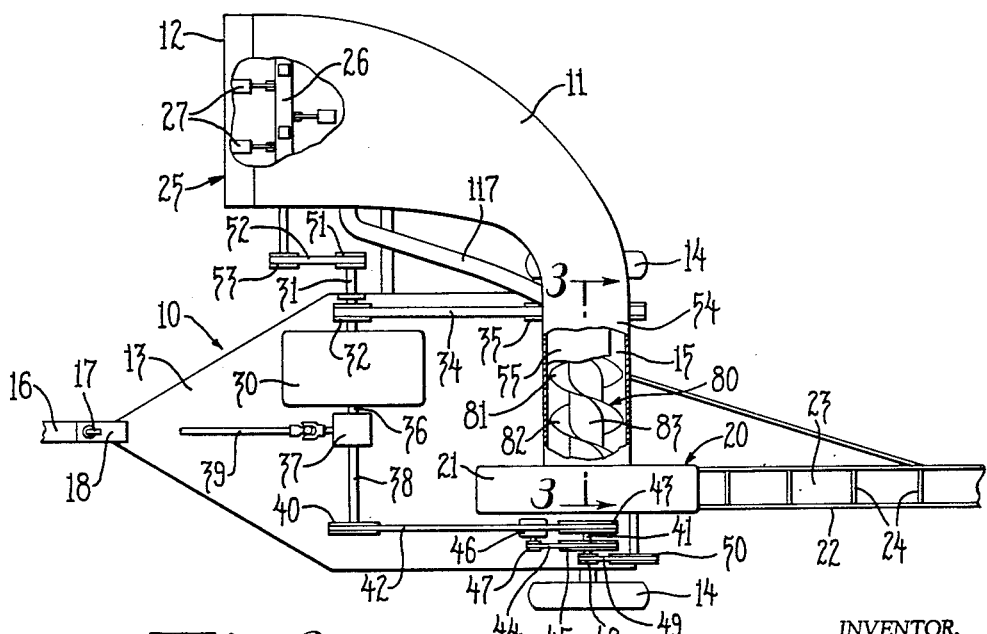
FIG. 2 is a plan view of the machine shown in FIGURE 1 with portions broken away to show portions of the rotary-flail and transfer auger.

While the invention will be described in connection with a preferred embodiment, it is to be understood that it is not intended to limit the invention to that particular embodiment. On the contrary, it is intended to embrace all alternatives, modifications and equivalents as are included within the spirit and scope of the invention as defined by the appended claims.

Referring more particularly to the drawings, there is shown a wafering machine, generally indicated at 10, which is adapted to be drawn through a field to collect a forage crop such as hay which has previously been cut and placed in windrows, and to process it into wafers. It will be appreciated that while reference is here made to forage crops generally and to hay in particular, the machine 10 is not limited to processing these crops, but may also be used to wafer many other crops such as, for example, straw, soybeans, cornstalks, sorghum and the like.

The wafering machine 10 includes a delivery chute 11 carried by a frame 13 whichis equipped with ground wheels 14. The chute 11 includes at its forward end 12 means for picking up windrowed hay, chopping it and delivering the chopped hay into the chute 11. In the illustrative machine the chute 11 directs the chopped and mixed hay into a hopper 15 carried by the frame 13. Incidentally, a draft connection to the tractor is indicated at the forward end of the mechanism and includes a tractor drawbar 16 which is attached by a drawbolt 17 to draft lugs 18 that are secured to the wafering machine frame 13.

From the hopper the hay is conveyed into a wafering mechanism 20 which is enclosed in a housing 21 and in which the compacted masses or wafers of the forage crop are formed. A suitable conveyor 22, which includes a belt 23 mounting transversely disposed flights 24, is provided for collecting and delivering the wafers from the housing 21.

As shown, the delivery chute 11 is mounted at the right side of the frame 13, and is disposed in an upwardly and rearwardly inclined position. Adjacent the forward end 12 of the chute there is provided means for picking up the windrowed hay, chopping and delivering it into the chute 11. Preferably, this means comprises a rotary flail 25 (see FIGURE 1) which includes a central shaft 26 journaled transversely in the forward end 12 of the chute 11. The shaft 26 mounts a series of radially extending blades 27. The outer end of each of the blades 27 is of arcuate paddle-like form, and the blades are pivotally connected to the shaft 26 in longitudinally and angularly spaced relation. When the blades 27 are in place and are rotated by the shaft 26, the paths traversed by their paddle-like outer ends overlap. The flail shaft 26 is rotated in a clockwise direction when viewed from the left side of the machine (as seen in FIGURE 1) so that the tips of the blades in the lower portion of their paths move in the direction of movement of the machine. Thus, they engage and lift the hay from the windrow as the machine 10 is drawn along the hayfield. The transverse, generally horizontal portion of the forward end 12 of the chute 11 not only assists in the picking up of the hay, but in addition it serves to prevent forward and outward thrusting of the hay as it is engaged by the blades 27 of the flail 25.

Desirably the machine 10 incorporates its own power source. For this purpose the illustrative machine 10 is equipped with an internal combustion engine indicated generally at 30 mounted on the frame 13. Power from the engine 30 is delivered by way of a main drive shaft 31 which mounts a drive pulley 32 from which power is coupled to an auger and pelleting roller shaft 33 by way of multiple drive belts 34 and a drum 35 that is secured to the shaft 33.

The engine 30 has a second drive shaft 36 coupled through speed reducer and clutch 37 to an auxiliary power shaft 38 which rotates at a different speed than the shaft 31. A control linkage 39 extends forwardly from the clutch 37 to a point within reach of the tractor operator. Mounted on the end of the shaft 38 is a drive pulley 40 from which power is coupled to a sub-shaft 41 by way of a drive belt 42 and a driven pulley 43. A belt 44 trained over a large sheave 45 on the sub-shaft 41 transmits power to a hydraulic pump 46 having a pulley 47. A smaller sheave 48 also mounted on the sub-shaft 41 engages a belt 49 that, in turn, engages a pulley 50 by means of which power is supplied to the conveyor belt 23.

Power for rotating the flail pick-up shaft 26 is also derived from the shaft 31 of the booster engine 30. For this purpose, the shaft 31 has mounted at its outer end a multiple pulley 51 about which are trained drive belts 52 extending thereto from a multiple sheave 53 that is nonrotatably secure to the corresponding end of the flail shaft 26.

Upon rotation of the flail shaft 26, not only do the flail blades 27 engage and lift the hay, but the blades also serve both to chop the hay and by virtue of centrifugal force, to project it upwardly and rearwardly into the upper or forward portion of the chute 11. Additionally, and as a result of the arrangement of the blades 27 on the shaft 26 in longitudinally and angularly spaced relation, the blades 27 also operate in the manner of a drum-type fan effectively scooping and delivering air along with the hay particles into the chute 11 at a relatively high velocity. This not only assists in conveying the particles along the chute 11, but it performs two additional functions as well. It will be apparent that the entrainment of the hay particles delivered by the flail 25 in the turbulent air stream results in a thorough commingling of the particles including stems and leaves. There is thus provided a substantially homogenized mix of loose, cut forage.

The second resulting function is what can be fairly termed a vacuum cleaning action. More particularly, the movement of the air caused by the rapidly rotating paddle flail blades 27 creates within the flail housing a region of substantially reduced air pressure as compared to that of the surrounding atmosphere. Consequently, loose hay particles such, for example, as leaves which may have become separated from the hay in the windrow are drawn up from the hayfield stubble and are entrained with the hay particles that result from engagement of the flail blades with the windrowed hay. These drawn-up particles along with the others, are delivered into the chute 11 where they, too, are mixed within the stream of chopped forage.

From the chute 11 the homogenized loose mass of chopped hay is delivered to the hopper 15. To direct the hay from the chute 11 into the hopper 15, an arcuate hood 54 is interposed between the upper end of the chute 11 and the top of the hopper.

Provision is also made for returning air delivered into the chute by the rotary flail 25 so as to save particles remaining airborne and not delivered to the hopper 15. For this purpose, a divider panel 55 is included in the chute 11 and hood 54. The panel 55 extends entirely across the chute 11 and terminates at its lower end at a point closely adjacent the path of the tips of the flail blades 27. The panel 55 thus divides the chute 11 into two independent channels 56 and 57. Into the upper or forward channel 56 is delivered the cut and chopped forage entrained in the air stream from the flail. Material and air flow through the channel 56 as indicated by appropriate upwardly and rearwardly directed arrows 58 in FIGURE 1.

When the loose mass of homogenized cut forage reaches the hood 54 it is directed thereby into the hopper 15. The upper end portion of the divider panel 55 terminates approximately centrally of the hood 54. Thus, some of the air which carried the homogenized loose mass of cut forage after having delivered the forage to the hopper 15 flows about the upper edge of the divider panel 55 and can return by way of the lower channel 57 of the chute 11. Any loose hay particles entrained therein are returned downwardly and forwardly, as indicated by the arrows 59, to the flail 25 for redelivery by it into the forward portion of the chute for commingling with newly chopped hay picked up from the windrow.

In the illustrative machine 10, the wafering mechanism 20 is disposed within the housing 21, and the latter defines a wafering chamber which contains a plurality of die cells 61. The die cells 61 of the wafering mechanism 20 are radially disposed in an annular arrangement with their inner ends defining the inner periphery of an annulus and their exit ends defining the outer periphery thereof. Thus, the annular arrangement of the die cells 61 effectively divides the wafering chamber into two parts: that portion within the inner periphery of the annulus, as defined by the entrance ends of the die cells, comprising an extruder-feed chamber 62, and that part within the housing 21 and exteriorly of the annulus comprising a collecting or recovery chamber 63.

Figure 3:
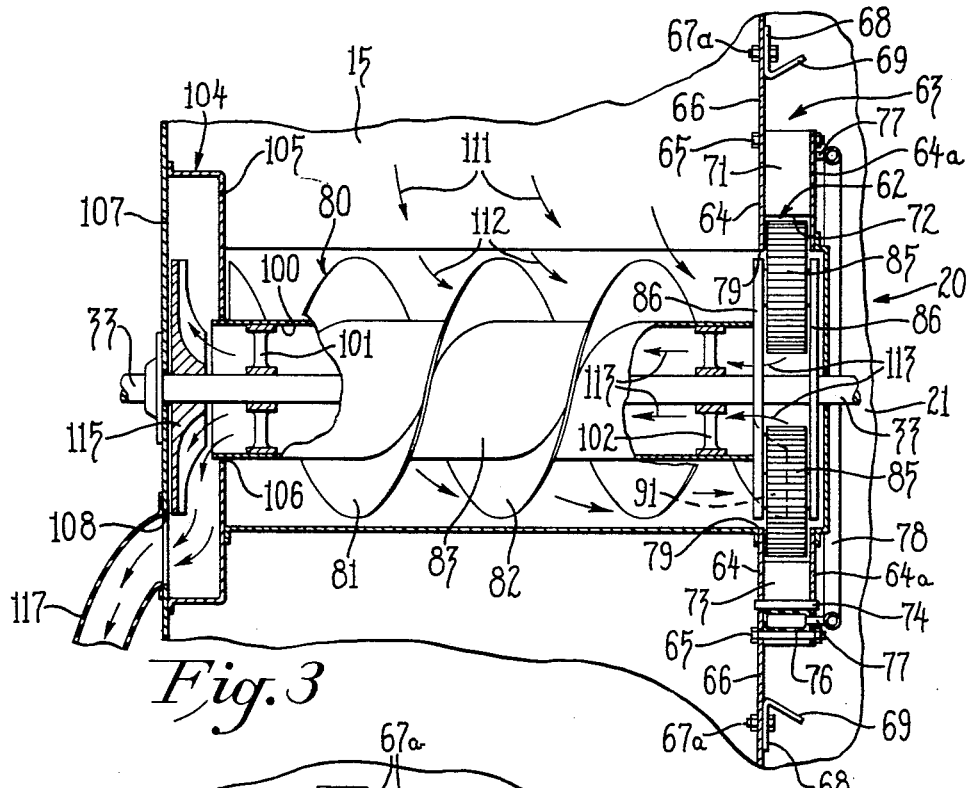
FIG. 3 is a fragmentary section on an enlarged scale taken substantially in the plane of line 3—3 in FIG. 2.

As best seen in FIG. 3 the side walls of the pellet-forming die cells 61 are defined by side plates 64 and 64a of the housing 21 and the die cell structures are secured thereto by means of through bolts 65. The entrance ends of the die cells 61 communicate with the extruder-feed chamber 62 to permit the forage crop to be delivered and compacted therein. Outwardly of the exit ends of the dies, the side wall 64 is extended as indicated at 66. Opposite the exit ends of the die cells, the extended side plate portion 66 is provided with a series of radially extending slots 67 in which are received mounting bolts 67a for supporting break-off plates 68, the latter having angularly outwardly disposed wafer engaging legs 69. As the compacted forage passes from the die cells into the chamber 63 it engages the plates 68 and is broken into individual wafers. The wafers then fall into the lower portion of the chamber where they are received upon the conveyor 22.

In the illustrative machine, the die cells 61 are equipped with thin central partitions 71 terminating at their inner ends in knife edges 72. Similarly, the wall structure between adjacent die cells terminates in sharpened tips 73. Rearwardly of the tips 73 are pivot pins 74 journalled between the plate portions 64, 64a on which movable longitudinal wall sections 75 are arranged in back-to-back relation in the form shown in FIG. 4. The cells are thus of converging cross-section from their entrance ends toward their exit ends.

Means is also included for urging the longitudinal, back-to-back wall members 75 away from each other to thus reduce the cross-section of the die cells which the tips 73 and the wall members 75 define. In this instance, such means includes hollow diaphragms 76 for the reception of pressure fluid. Pressure fluid is supplied equally within the diaphragms 76 by way of fluid connections 77 from a common manifold 78 adapted to be coupled to a source of fluid pressure which in this instance comprises the hydraulic pump 46.

Figure 4:
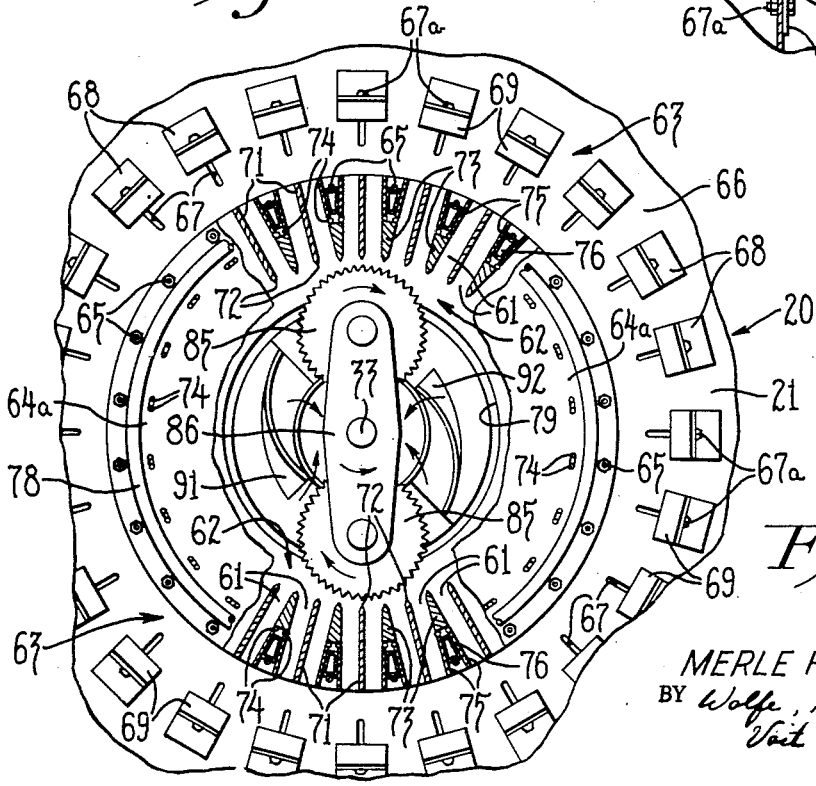
FIG. 4 is an end view of the wafering mechanism with parts broken away to show fragmentary sections.

In examining FIGS. 3 and 4, it will be apparent that if the chopped forage passes too freely through the die cells, the force exerted thereby on the cell walls 75 will be reduced. Under these conditions, and since a constant fluid pressure is exerted against the opposite sides of the cell walls by the diaphragms 76, the cell walls will be moved inwardly until the cross-sectional arrangement of the cells is sufficiently restricted to automatically restore the force applied to the sides of the compacted forage being expressed through the cell. Substantially constant force upon the forage within the cells is thereby assured precluding passage of the material in improperly bonded form because the diaphragms 76 are connected by way of the manifold or pressure ring 78 which in turn is supplied from a single pressure fluid source. Thus, the force exerted by the diaphragms against the abutting portions of the longitudinal walls 75 of the die cells all around the die annulus remains constant, and consequently, uniformly dense wafers of the compacted forage are produced.

The loose mass of homogenized cut hay or forage crop delivered to the hopper 15 is thereafter transferred into the extruder-feed chamber 62. Thus, an access opening 79 is formed in the right side wall 64 of the housing 21 providing communication between the hopper 15 and the extruder-feed chamber 62. Means is provided for conveying homogenized cut forage from the hopper 15 through the opening 79. In the illustrative device, this means comprises an auger type conveyor 80. As shown, the conveyor 80 is composed of two helical flights 81 and 82 which are mounted about a core member 83 carried by the shaft 33.

Preferably, the auger conveyor 80 is rotated at relatively high speed, e.g., at a rate of approximately 500 r.p.m. Such operation of the conveyor 80 imparts a whirling motion to the mass of homogenized chopped hay so that it is distributed, centrifugally about the periphery of the extruder-feed chamber 62 over the entrance ends of the die cells 61.

Means is provided for forcing the homogenized chopped hay that is disposed about the extruder-feed chamber 62 and over the die cell openings into the die cells 61 and against the knife edges 72 to sever the hay that is forced into one die cell from that in the next adjacent cells. For this purpose the exemplary machine utilizes a pair of rollers 85 of substantial mass. The rollers 85, which may have serrated or longitudinally ribbed peripheral surfaces, are carried by a frame which includes a pair of diametrically extending arms 86 which are rigid with the shaft 33 for rotation thereby and are disposed within the chamber 62. The rollers are so located that their peripheral surfaces traverse a path close to, but separated from, the periphery of the chamber 62 as defined by the entrance ends of the die cells indicated by the knife edges 72.

It is to be noted that the flights 81 and 82 of the auger conveyor 80 terminate at the opening 79 into the extruder-feed chamber 62. To the end that the loose mass of cut hay is delivered into these portions of the chamber 62, between the rollers 85 and the supporting arms 86, and the entry of the hay is not impeded thereby, the supporting arms are fixed to the shaft 33 in angularly offset, trailing relation with respect to the terminal edges of the auger conveyor flights.

To insure that the homogenized forage is delivered into proximity with the openings or entrance ends of the die cells 61, means is provided to press the forage toward the periphery of chamber 62 in advance of the rollers 85. In the illustrative device, this means comprises a pair of vanes 91 and 92 which are respectively fixed to the auger flights 81 and 82 on opposite sides of the arm 86. As shown, each of the vanes 91, 92 is of arcuate form and extends into the chamber 62 so as to present a smooth outwardly facing forage-engaging surface oppositely disposed to the die cell entrances. The leading edge portions of the vanes 91, 92 are located in closely spaced relation to the central portion of the arms 86 while their trailing edges terminate adjacent the leading portions of the peripheral surfaces of the rollers 85.

As the homogenized cut forage is impelled into the extruder-feed chamber 62 it is engaged between vanes 91, 92 and is urged by them outwardly about the periphery of the chamber, over the die cell openings. The material is delivered by the vanes sufficiently close to the periphery of the chamber 62 that, when the forage is engaged by the rollers 85, such engagement occurs outwardly of planes passing through the rollers' axes perpendicular to the arms 86. Thus, even when a large mass of homogenized cut forage enters the chamber, it is not pushed about the chamber by the rollers and arms, but instead is promptly pressed by the rollers toward the die cell entrances.

As previously noted, the air stream entraining the homogenized forage material which passes through the chute 11 is directed by the hood 54 into the hopper 15. While some of this air is returned to the vicinity of the flail pick-up by way of the chute channel 57, it will be apparent that some of it is also directed toward and through the opening 79 into the extruder-feed chamber 62 along with the crop material delivered by the conveyor 80.

Since communication is blocked between the extruder-feed chamber 62 and the recovery chamber 63 due to the compacted forage material within the individual die cells 61, air directed into the extruder-feed chamber 62 cannot escape through the die cells. In accordance with the present invention provision is made for exhausting air from the extruder-feed chamber 62. Thus, an air pressure build-up is avoided, which if permitted would hamper the efficient production of tightly compacted hay wafers by impairing delivery of the chopped forage crop into the extruder-feed chamber 62 and by creating excessive turbulence in that chamber which would tend to suspend or float the forage particles and thereby interfere with the efficient operation of the mechanism 20 by means of which the material is urged into the wafering dies 61.

In carrying out the invention an exhaust passageway 100 communicating with the extruder-feed chamber 62 is provided to permit the escape of excess air which has been introduced into the chamber along with the chopped forage particles. In the preferred embodiment, the exhaust passage 100 is defined by the tubular core member 83 upon which the auger flights 81, 82 are mounted. The core 83 is mounted upon the shaft 33 by means of spiders 101 and 102 which, as shown, are disposed adjacent the respective ends of the tube. The spiders are of the open spoke-like construction permitting substantially free air flow through the passage 100.

To receive the flow of air from the passage 100, an exhaust housing 104 is provided within the hopper 15 at the end of the conveyor 80 remote from the chamber 62. The exhaust housing 104 has an inner wall 105 provided with an opening 106 into which the passage 100 of the core member 83 opens. The outer wall 107 of the housing 104 has a discharge port 108 therein. It can be seen, by reference to FIG. 3, that the movement of air within the hopper 15 and the wafering chamber 62 is as follows: The incoming forage-entrained stream of air is represented by arrows 111 directed downwardly from the hood 54 into the hopper 15. As previously described, a portion of this air stream can return through the lower channel 57 of the chute 11 to the vicinity of the rotary flail 25. Another portion of the air, and chopped forage material, represented by arrows 112, is directed through the opening 79 into the chamber 62. Due to the centrifugal movement and the action of the vanes 91, 92 and rollers 85 within the chamber 62 the forage particles are directed outwardly into the entrance ends of the die cells 61. Excess air is centrally exhausted, as shown by arrows 113, through the passage 100. The exhausted air is then discharged through the housing 104 and exhaust port 108.

As shown in the exemplary machine, an additional aid is provided for exhausting the air from the chamber 62. To this end an exhaust impeller 115 is fixed on the shaft 33 within the exhaust housing 104. Thus, when the shaft 33 is rotated at a relatively high speed, as previously described, the auger flights 81, 82 carry commingled forage material and the air into the chamber 62, and the rotating exhaust impeller 115 assists in drawing the air through the passage 100 to evacuate the chamber.

Since, in some cases the degree of separation of hay particles from the exhausted air may not be complete, means has been provided for returning the exhausted air and any remaining forage particles. In the illustrative machine this return means includes a duct 117 which is coupled at its upper end to the discharge port 108 of the housing 104. The lower end of the return duct 117 passes into the lower channel 57 of the chute 11. Accordingly, communication is provided adjacent to the intake side of the rotary-flail 25. Thus, the exhausted air and any entrained forage particles are conveyed through the duct 117 and the particles are reintroduced for commingling with subsequently gathered forage for delivery with it through the channel 56 of the chute 11 and thence back to the hopper 15.

I claim as my invention:

1. For use with a hay wafering machine having a rotary-flail type pick-up and an extruder-feed chamber, the combination, comprising, a hopper located adjacent to and opening into the chamber, a delivery chute interposed between the flail and said hopper for directing air and crop material from the flail to said hopper, means disposed within said hopper for conveying crop material therefrom into the chamber, and said conveyor means including a passageway communicating with the chamber for exhausting air blown into the chamber from the rotary flail.

2. For use with a hay wafering machine having a rotary-flail type pick-up and chopper and a wafering mechanism including an extruder-feed chamber, the combination, comprising, a hopper located adjacent to and opening into the chamber, a delivery chute interposed between the flail and said hopper for directing air and crop material from the flail to said hopper, means disposed within said hopper for conveying crop material therefrom into the chamber, said conveyor means including a hollow core member communicating with the chamber for exhausting air blown into the chamber from the rotary-flail, and means defining an exhaust air passageway communicating between said core member and said chute for recirculating the air exhausted from the chamber.

3. For use with a hay wafering machine having a rotary-flail type pick-up and a wafering mechanism including an extruder-feed chamber, the combination, comprising, a hopper located adjacent to and opening into the chamber, a shaft axially extending through said hopper and the chamber and having a plurality of spiders secured thereto, and an auger for conveying crop material from said hopper into the chamber and including a tubular core member mounted on said spiders, said core member defining an exhaust passage for conducting air from the chamber.

4. A machine for preparing hay and similar forage crops comprising, in combination, a wheeled frame, a longitudinally divided chute carried by said frame, means including a rotary-flail for picking up and chopping hay and delivering it entrained in an air stream into one side of said chute, a hopper carried by said frame for receiving hay from said chute, the other side of said chute returning excess air from said hopper and any hay particles carried thereby to said flail for commingling with subsequently picked up hay, a wafering mechanism including a chamber communicating with said hopper, and means for transferring hay from said hopper into said chamber, said means including a hollow core member extending through said hopper and defining a passage for exhausting excess air from said chamber.

5. A machine for preparing hay and similar forage crops comprising, in combination, a wheeled frame, a longitudinally divided chute carried by said frame, means including a rotary-flail for picking up and chopping hay and delivering it entrained in an air stream into one side of said chute, a hopper carried by said frame for receiving hay from said chute, the other side of said chute returning excess air and any hay particles carried thereby to said flail for commingling with subsequently picked up hay, a wafering mechanism including a chamber communicating with said hopper, means for transferring hay from said hopper into said chamber, said means including a hollow core member extending through said hopper and defining a passage for exhausting excess air from said chamber, and a discharge duct interposed between said passage and said chute for returning the exhausted air and any entrained crop particles to the vicinity of said rotary-flail.

6. A machine for preparing forage crops comprising, in combination, a wheeled frame, a delivery chute carried by said frame, means carried by said frame including a rotary-flail for picking up and chopping the forage and delivering it into said chute, a hopper carried by said frame for receiving forage from said chute, a wafering mechanism including a chamber communicating with said hopper, a shaft extending through said hopper and into said chamber, said shaft having a hollow core member concentrically mounted thereon and extending from said chamber, an auger flight mounted on said core member within said hopper for conveying forage therefrom into said chamber, said core member providing an exhaust passage for the flow of air from said chamber and through said hopper, an impeller secured to said shaft adjacent the end of said core member remote from said chamber for drawing air through said passage from said chamber.

7. A machine for preparing forage crops comprising, in combination, a wheeled frame, a delivery chute carried by said frame, means carried by said frame including a rotary-flail for picking up and chopping the forage and delivering it into said chute, a hopper carried by said frame for receiving forage from said chute, a wafering mechanism including a chamber communicating with said hopper, a shaft extending through said hopper and into said chamber, said shaft having a hollow core member concentrically mounted thereon and extending from said chamber, an auger flight mounted on said core member within said hopper for conveying forage therefrom into said chamber, said core member providing an exhaust passage for the flow of air from said chamber and through said hopper, a housing mounted on said hopper and communicating with said passage, an impeller disposed within said housing and secured to said shaft adjacent the end of said core member remote from said chamber for drawing air through said passage from said chamber into said housing, and an exhaust duct interposed between said housing and said chute adjacent said flail for returning air and any entrained forage material exhausted from said chamber to the vicinity of said flail for commingling with newly picked up forage.

8. In a forage crop wafering machine, the combination, comprising, a hopper, a wafering mechanism including an extruder-feed chamber communicating with said hopper, a housing secured to said hopper remote from said chamber, said housing having a discharge port outside said hopper, a shaft rotatable within said housing, hopper and chamber, means disposed within said hopper for transferring forage material into said chamber, said means defining an exhaust passage interconnecting said chamber and said housing, and an impeller disposed within said housing adjacent the end of said passage for drawing air from said chamber through said passage and directing it out through said discharge port.

9. In a forage crop wafering machine having a rotary-flail type pick-up and a wafering mechanism including an extruder-feed chamber, the combination, comprising, a chute for delivering the forage entrained in an air stream from the pick-up to the chamber, and means for exhausting the excess air from the chamber, said means including a passage communicating at one end with the chamber and at its other end with said chute so as to exhaust air from the chamber and return any remaining forage for re-entrainment with newly picked-up forage.

10. In a forage crop wafering machine having a rotary-flail type pick-up and a wafering mechanism including an extruder-feed chamber, the combination, comprising, a chute for delivering the forage entrained in an air stream from the pick-up to the chamber, and means for exhausting the excess air from the chamber, said means including a passage communicating at one end with the chamber and at its other end with said chute and including an impeller disposed within said passage for withdrawing excess air from the chamber and directing it and any remaining forage particles to said chute for commingling with newly received forage.

References Cited in the file of this patent

UNITED STATES PATENTS

| | | |
|---|---|---|
| 1,769,197 | Wetmore | July 1, 1930 |
| 2,811,004 | Borrow | Oct. 29, 1957 |
| 2,864,223 | Lundell | Dec. 16, 1958 |

FOREIGN PATENTS

| | | |
|---|---|---|
| 233,148 | Australia | Mar. 28, 1961 |
| 1,250,174 | France | Nov. 28, 1960 |